United States Patent [19]

Yamashita

[11] Patent Number: 5,182,445
[45] Date of Patent: Jan. 26, 1993

[54] CONTACT TYPE LINE IMAGE SENSOR

[75] Inventor: Hiromi Yamashita, Hyogo, Japan

[73] Assignee: Mitsubishi Denki Kabushiki Kaisha, Tokyo, Japan

[21] Appl. No.: 668,566

[22] Filed: Mar. 13, 1991

[30] Foreign Application Priority Data

Jul. 9, 1990 [JP] Japan .................................. 2-181239

[51] Int. Cl.⁵ .............................................. G01J 1/04
[52] U.S. Cl. .................................................. 250/208.1
[58] Field of Search ...................................... 250/208.1

[56] References Cited

U.S. PATENT DOCUMENTS 5,004,905  4/1991  Yoshinouchi et al. ........... 250/208.1

*Primary Examiner*—Constantine Hannaher
*Attorney, Agent, or Firm*—Rothwell, Figg, Ernst & Kurz

[57] ABSTRACT

A contact type image sensor provided with a case wherein a read space subject to damage by dust and a light source space less damaged by dust are completely separated from each other, and the light source space is formed with a reflecting mirror surface for effectively guiding light from the light source to an original read surface, whereby a uniform read image is obtained by the enhancement of original read performance without occurrence of deterioration in the quality of the image caused by dust.

5 Claims, 4 Drawing Sheets

CONTACT TYPE LINE IMAGE SENSOR

BACKGROUND OF THE INVENTION

1. Field of the Invention

This invention relates to a contact type line image sensor for use in facsimile machines, document scanners, smart copiers, and the like. Such a line image sensor scans original documents line by line and outputs an electric signal representing the image to a processing circuit.

2. Description of the Prior Art

FIG. 1 is a cross-sectional view of a conventional contact type line image sensor. In this figure, reference numeral 1 designates an original document to be scanned; 2 is a pressing platen formed of silicone rubber for pressing the original document against a glass plate 3; 4 is an original read surface; 5 is an LED element light source containing a plurality of LEDs arranged in a line; 6 is a rod lens array containing a plurality of lenses arranged in a line; 7 is an IC sensor element array; 8 is a ceramic print wiring substrate applied with a thick film printing; 9 denotes a flexible substrate for connecting the substrate 8 to the pins 10a of a connector 10; 11 denotes a frame made of aluminum with the aforementioned parts assembled thereon at predetermined positions; and 16 is a mold material or a glass cover for protecting the IC sensor element 7.

Next, the operation will be described. The original document 1 is transported in a direction as indicated by the arrow while being pressed against the original read surface 4 of the glass plate 3 upon rotation of the pressing platen 2. Original characters or the like of the original document on the read surface 4 are illuminated by the light source 5 and are focussed on the IC sensor element 7 through the rod lens array 6. Information read by the IC sensor element 7 is fed to the connector 10 through a conductor pattern (not shown) formed on the print wiring substrate 8 and the flexible print substrate 9.

The original read surface 4 is formed on the surface of the glass plate 3 fitted within the frame 11 so as not to obscure the optical system of the rod lens array 6. An internal space constituted by the frame 11 and the glass plate 3 is so sensitive to dust that when dust enters the space, read information becomes distorted, producing extra lines or gaps in information. Therefore, the aforesaid space is closed in order to prevent entry of dust from the exterior.

The conventional contact type image sensor is constructed as described above. While the sensor is protected from external dust, there are many internal parts provided. The internal construction is complicated, and the sensor is susceptible to particles such as fragments produced from the assembly of the internal parts or chips from the frame produced as a consequence of construction. Furthermore, optically, the distance between the light source 5 and the original read surface 4 is short. Therefore, there poses a problem in that irregularities in brightness between LED elements disposed in a linear array as a light source 5 are apparent on the read surface 4, thus deteriorating the image quality of the original document 1.

SUMMARY OF THE INVENTION

This invention has been achieved in order to overcome the above-described problems. An object of the present invention is to provide a contact type line image sensor which is impervious to dust and other light-interfering particles, realizes reduction in costs and attains an enhancement in original image reading performance.

A contact type line image sensor according to the present invention comprises a print wiring substrate having a light source and an IC sensor element mounted thereon, a glass plate having an original read surface formed thereon, a case having said print wiring substrate provided on one end thereof and said glass plate provided on the other end thereof, a light source space separately formed within said case and having a reflecting mirror surface for reflecting light from said light source onto the original read surface of said glass plate, and a rod lens array for focussing an image read at said original read surface on said IC sensor element.

DETAILED DESCRIPTION OF THE PREFERRED EMBODIMENTS

Figure 1:
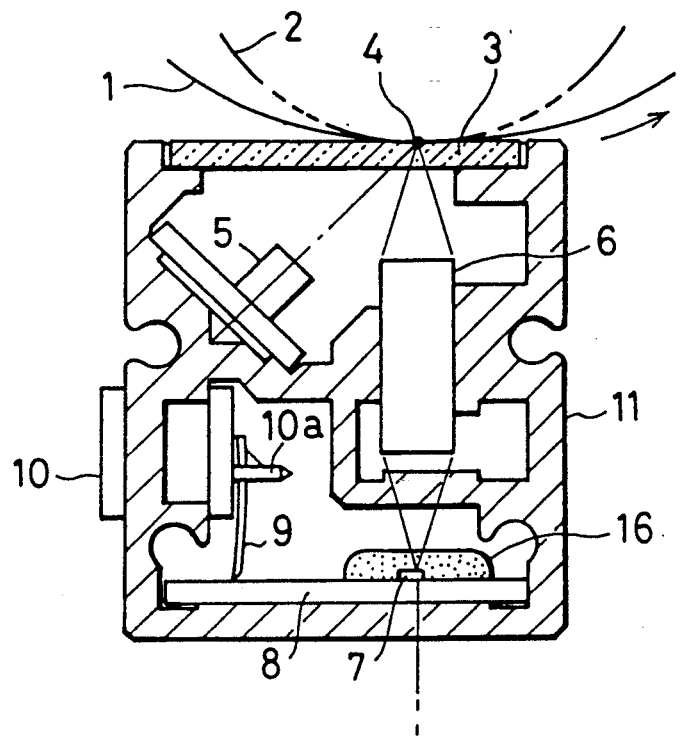
FIG. 1 is a cross sectional view showing a conventional contact type line image sensor.
Figure 2A:
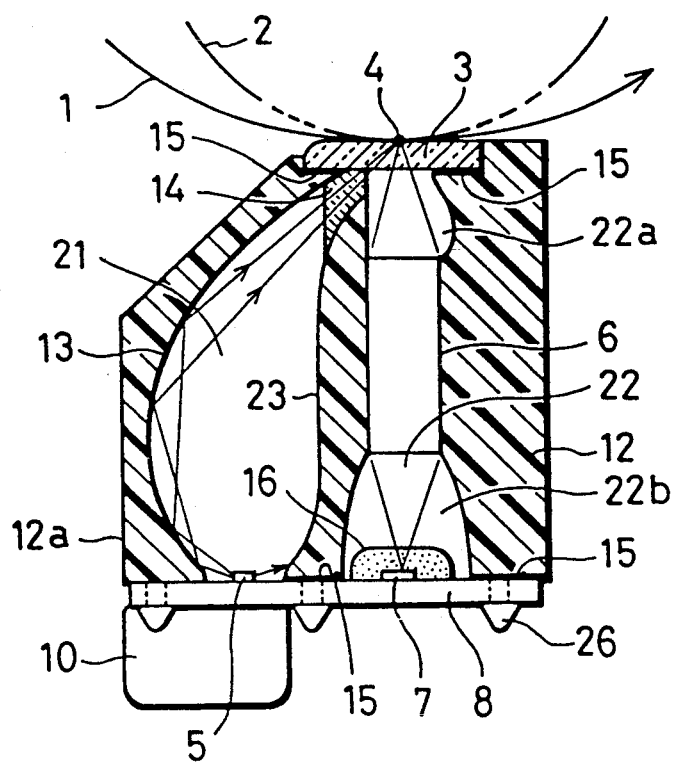
FIG. 2A is a cross sectional view showing a contact type line image sensor according to one embodiment of the present invention.
Figure 2:
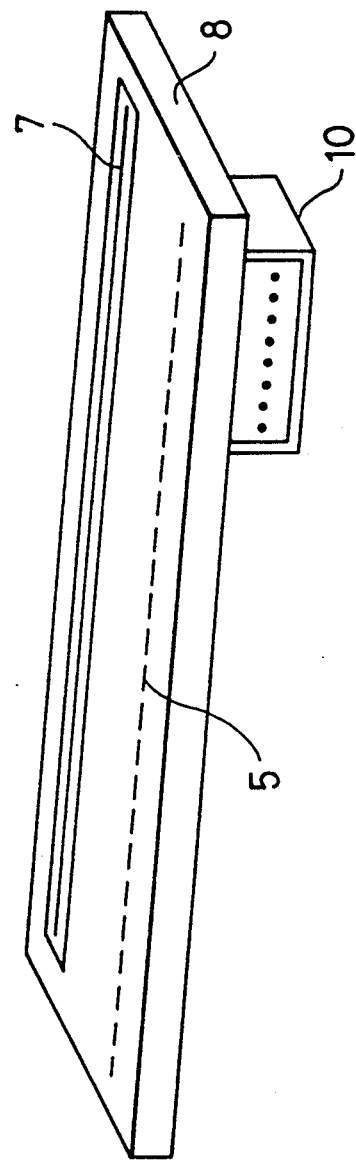
FIG. 2 is a perspective view of a substrate containing an LED array light source and an IC sensor element array according to one embodiment of the invention.

A preferred embodiment of this invention will now be described with reference to the drawings. In FIGS. 2 and 2A reference number 1 designates an original document; 2 is a pressing platen for pressing an original document on a glass plate 3; 4 is an original read surface; 5 is an LED element as a light source; 6 is a rod lens array; and 7 is an IC sensor element, these parts being the same as those of the aforementioned conventional apparatus.

Reference numeral 8 designates a print wiring substrate having the LED element array 5 and the IC sensor element 7 array mounted thereon and having a mutual wiring pattern; 10 is a connector having connection pins for connecting to a cable of a processing circuit interface, mounted by solder on the substrate 8; and 12 is a case made of resin, for example, having a glass plate 3 mounted by adhesive 15 at one end thereof and the print wiring substrate 8 mounted by projections 26 extending through holes in the substrate at the other end thereof. The resin case 12 is formed with an internal separate light source space 21 for illuminating the original read surface 4 of the glass plate 3 by light from the LED element array 5 and a separate read space 22 receiving the rod lens array 6 and focussing an image read at the original read surface 4 onto the IC sensor element array 7, said light source space 21 and said read space 22 being separated from each other by a partitioning wall 23.

The rod lens array 6 does not obstruct a space 22a leading to the original read surface 4 or a space 22b leading to the IC sensor element 7, and is provided at the minimum volume required not to impair the mounting of the IC sensor element 7.

Reference numeral 13 designates a reflecting mirror surface which has been subjected to metal film processing, the reflecting mirror surface 13 being formed on a wall surface of the light source space 21 so as to condense and direct light from the light source array 5 to the original read surface 4; 14 is an acrylic transparent plate provided as a light guide formed as a portion of the partitioning wall 23; 15 is an adhesive for mounting the glass plate 3, the print wiring substrate 8 and the acrylic plate 14 to the resin case 12 so as to seal the interior of the resin case 12; and 16 is a transparent mold material or a glass cover for protecting the IC sensor element array 7.

Next, operation of the above-described embodiment will be described. The original document 1 is transported in a direction as indicated by the arrow while being pressed against the original read surface 4 upon rotation of the pressing platen 2.

The light generated from the LED element array 5 mounted on the print wiring substrate 8 together with the IC sensor element array 7 is reflected by the reflecting mirror surface 13 within the light source space 21 and is linearly condensed at the original read surface 4 through the acrylic plate 14.

Therefore, original characters or the like on the original read surface 4 are irradiated by the aforesaid condensed light and focussed onto the IC sensor element array 7 through the rod lens array 6. The information read by the IC sensor element array 7 is directly transmitted to the connector 10 through a conductor pattern (not shown) formed on the print wiring substrate 8.

It is noted that the LED elements 5 are normally disposed linearly at intervals of 8 mm pitch. In order for light from the LED elements 5 to be linearly evenly condensed on the original read surface 4, the reflecting mirror surface 13 needs to have a convex or concave shape in cross section. Therefore, while in the above-described embodiment, the internal surface of the resin case 12 has been subjected to metal film processing to form the reflection condensed mirror surface 13 having a convex cross section, it is to be noted that a reflection condensed mirror surface obtained by molding a metal plate may also be sued.

Furthermore, in the above-described embodiment, for securing the print wiring substrate 8 to the resin case 12, projections 26 molded integrally with the resin case 12 have been used. While the rod lens array 6 has been molded integrally with the resin case 12, it is to be noted that separate molded parts may be fitted together or they may be attached together by adhesive.

Figure 3:
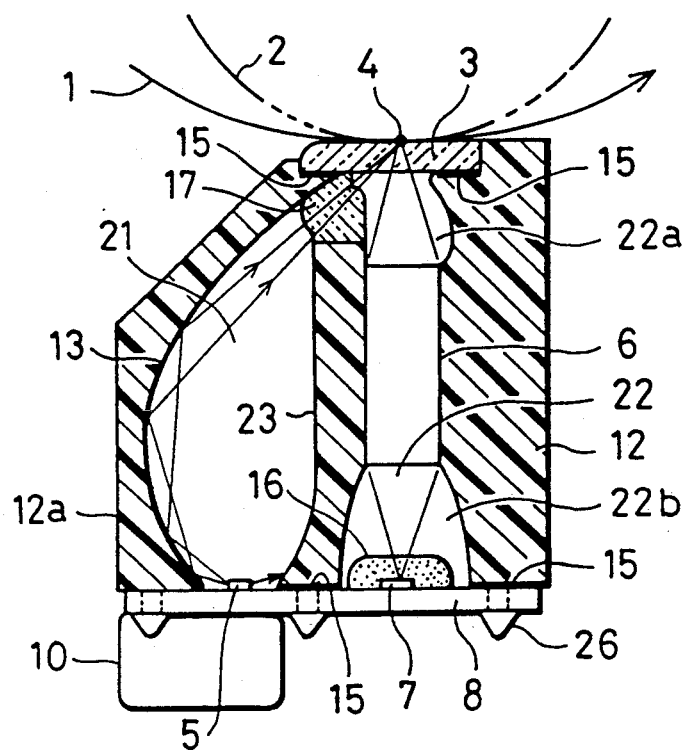
FIGS. 3, 4, 5 and 6 are respectively cross sectional views showing a contact type line image sensor according to modified embodiments of the present invention.
Figure 4:
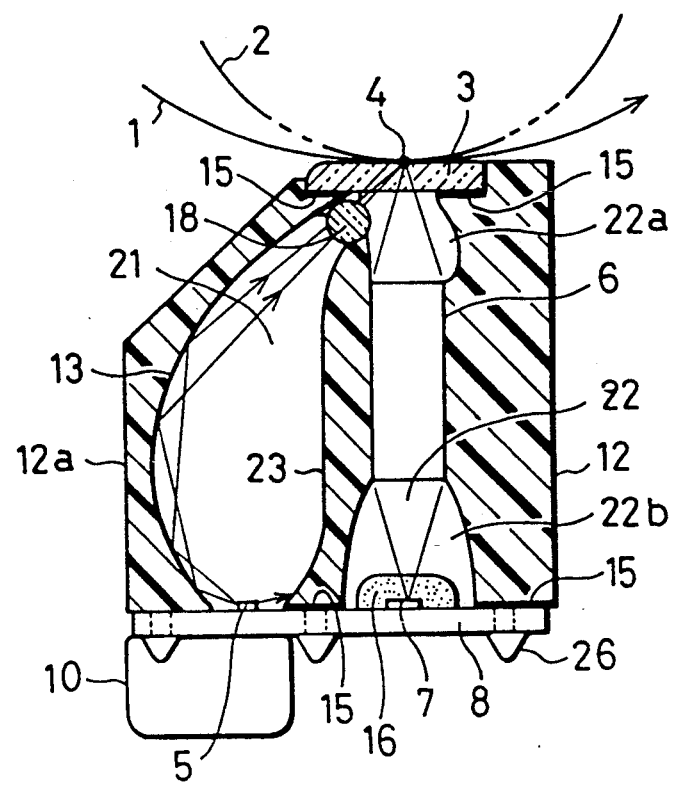

Moreover, while the acrylic plate 14 has been provided on the partitioning wall 23 so as to guide light from the reflection mirror surface 13 to the original read surface 4, it is to be noted that an acrylic plate 17 may be made in the form of a lens having a circular or oval shape in section as shown in FIG. 3 for condensation of light onto the original read surface 4. In addition, as shown in FIG. 4, an elongated glass rod 18 having a circular or oval shape in section may be employed in place of the acrylic plate 14.

While resin case 12 has been shown, it is to be noted that a case made of material other than resin may be used as long as the light source space 21 can be separated from the read space 22.

As described above, according to the present invention, the resin case contains a print wiring substrate having a light source array and an IC sensor element array mounted thereon and a glass plate having an original read surface, said case having a sealed interior. The resin case has a separately formed light source space having a reflecting mirror surface for reflecting the light from the light source onto the original read surface and a read space having a rod lens array for focussing the image read at the original read surface onto the IC sensor element array, and a transparent plate is disposed at the light guide portion of the partitioning wall between the spaces. Therefore, the apparatus is not affected by dust or particulate material formed during construction. The light from the light source can be effectively condensed onto the original surface, and the original read performance is enhanced and a uniform, undistorted read image can be obtained.

Figure 5:
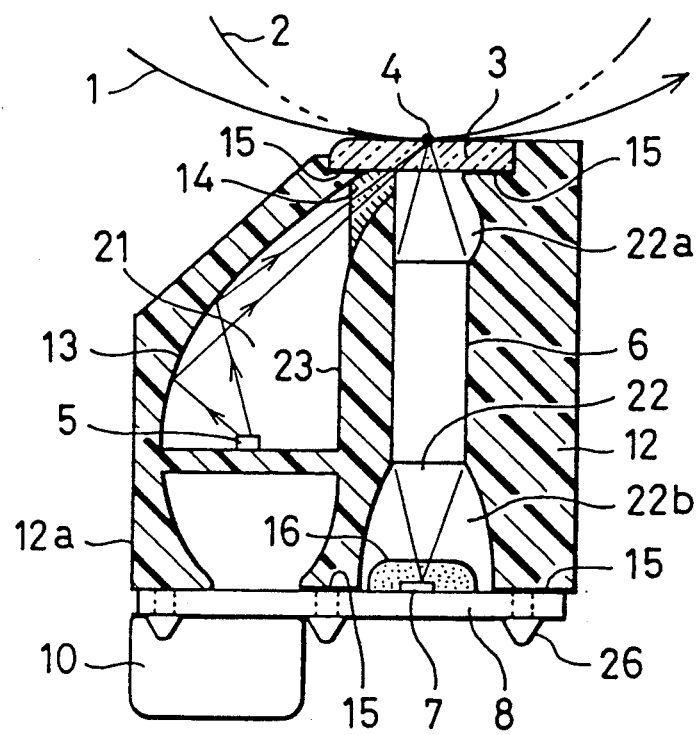

Further, although the light source array 5 has been shown as mounted on the substrate 8, this need not be the case; as shown in FIG. 5, the light source array 5 may be mounted within the space 21 apart from the substrate, with a wiring pattern formed on the interior surface of the case 12 extending to the substrate.

Figure 6:
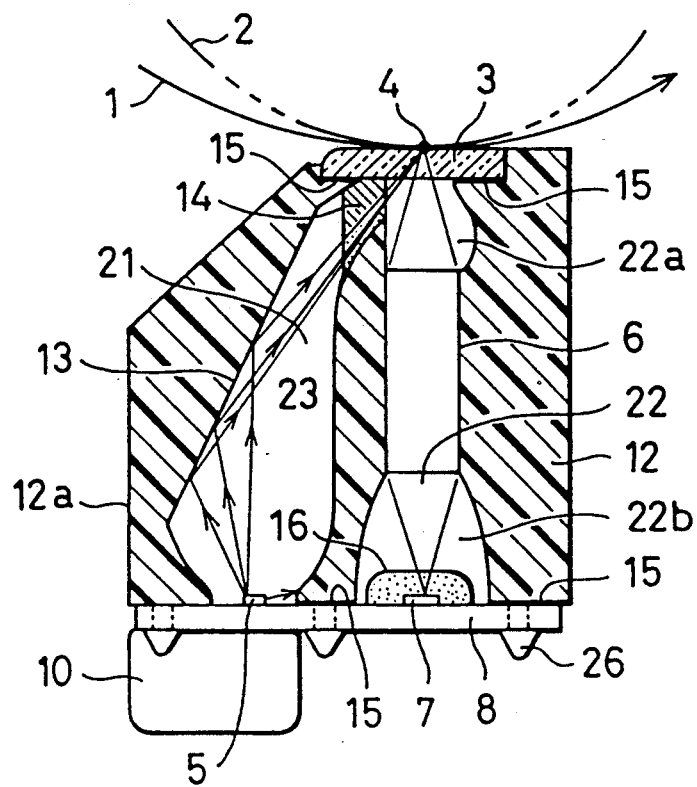

Also, it is possible for reflecting mirror surface 13 to be flat rather than concave, as shown in FIG. 6.

The invention having been thus described, it will be obvious to those skilled in the art that the same may vary in even more ways without departing from the spirit and scope of the invention. Any and all such modifications are intended to be included within the scope of the following claims.

What is claimed is:

1. A contact type line image sensor, comprising:
   a case having a light source space and a separate image reading space located therewithin;
   a transparent plate mounted at one end of said case and having a read surface from which original image information is read from an original document pressed against said read surface;
   a light source and a reflecting mirror surface provided within said light source space, said reflecting mirror surface reflecting light from said light source to said read surface of said transparent plate;
   an IC sensor element and a rod lens array provided within said image reading space, said rod lens array focusing light from read surface onto said IC sensor element for converting light image information into electrical image information;
   a partitioning wall constituting a barrier between said light source space and said image reading space formed within said case; and
   said partitioning wall further including a light guide for condensing light from said reflecting mirror surface to said read surface of said transparent plate.

2. A contact type line image sensor according to claim 1, wherein said light guide comprises an acrylic plate.

3. A contact type line image sensor according to claim 2, wherein said acrylic plate has a substantially circular cross section.

4. A contact type line image sensor according to claim 1, wherein said light guide comprises a glass rod.

5. A contact type line image sensor, comprising:
   a case having a light source space and a separate image reading space located therewithin:
   a transparent plate mounted at one end of said case and having a read surface from which original image information is read from an original document pressed against said read surface;
   a light source and a reflecting mirror surface provided within said light source space, said reflecting mirror surface reflecting light from said light source to said read surface of said transparent plate;

an IC sensor element and a rod lens array provided within said image reading space, said rod lens array focusing light from said read surface onto said IC sensor element for converting light image information into electrical image information;

a partitioning wall constituting a barrier between said light source space and said image reading space formed within said case; and said reflecting mirror surface being concave in shape.

* * * * *

UNITED STATES PATENT AND TRADEMARK OFFICE
CERTIFICATE OF CORRECTION

PATENT NO. : 5,182,445
DATED : January 26, 1993
INVENTOR(S) : Hiromi Yamashita

It is certified that error appears in the above-indentified patent and that said Letters Patent is hereby corrected as shown below:

Column 3, line 40, "sued" should be --used--.

Signed and Sealed this

Fourth Day of January, 1994

Attest:

BRUCE LEHMAN

Attesting Officer

Commissioner of Patents and Trademarks